United States Patent
Williams et al.

[19]

[11] Patent Number: 6,075,971
[45] Date of Patent: Jun. 13, 2000

[54] METHOD AND APPARATUS FOR PROVIDING AND MONITORING COUPONS VIA A NETWORK

[75] Inventors: Christopher D. Williams, Soquel; Jean M. Goldschmidt-Iki, San Jose; Anthony A. Shah-Nazaroff, Santa Clara; David N. Hackson, Sunnyvale, all of Calif.

[73] Assignee: Intel Corporation, Santa Clara, Calif.

[21] Appl. No.: 09/049,884

[22] Filed: Mar. 27, 1998

[51] Int. Cl.[7] .................................................... H04N 7/173
[52] U.S. Cl. .............................. 455/5.1; 455/6.2; 348/10; 705/14
[58] Field of Search ............................... 348/1, 3, 10, 12, 348/13, 7; 455/6.2, 6.3, 5.1, 2; 345/327; 709/217, 218, 219; 705/10, 14; H04N 7/16, 7/173

[56] References Cited

U.S. PATENT DOCUMENTS

| | | |
|---|---|---|
| 3,769,579 | 10/1973 | Harney . |
| 4,937,821 | 6/1990 | Boulton . |
| 4,970,681 | 11/1990 | Bennett . |
| 5,201,010 | 4/1993 | Deaton et al. . |
| 5,283,819 | 2/1994 | Glick et al. . |
| 5,287,181 | 2/1994 | Holman . |
| 5,305,195 | 4/1994 | Murphy . |
| 5,404,393 | 4/1995 | Remillard . |
| 5,446,919 | 8/1995 | Wilkins . |
| 5,500,681 | 3/1996 | Jones . |
| 5,502,636 | 3/1996 | Clarke . |
| 5,515,098 | 5/1996 | Carles . |
| 5,532,735 | 7/1996 | Blahut et al. . |
| 5,583,560 | 12/1996 | Florin et al. . |
| 5,594,509 | 1/1997 | Florin et al. . |
| 5,604,542 | 2/1997 | Dedrick . |
| 5,621,456 | 4/1997 | Florin et al. . |
| 5,822,735 | 10/1998 | De Lapa et al. ........................ 705/14 |
| 5,901,287 | 5/1999 | Bull et al. ......................... 395/200.48 |
| 5,905,865 | 5/1999 | Palmer et al. ..................... 395/200.47 |
| 5,923,016 | 7/1999 | Fredregill et al. ....................... 705/14 |

*Primary Examiner*—Chris Grant
*Attorney, Agent, or Firm*—Blakely, Sokoloff, Taylor & Zafman LLP

[57] ABSTRACT

The present invention provides a method and apparatus for targeting specific audiences for coupon distribution. In one embodiment, users of an entertainment network are monitored to determine specific preferences. Alternatively, the users may be surveyed to determine preferences. A preference profile is determined based on the preferences. Coupons are distributed only to the users that fit a coupon distributor's chosen preference profile. The coupons may be delivered in a variety of ways. For example, coupons may be downloaded to a user's system automatically or on demand. Alternatively, coupons may be mailed to the user automatically or on demand. The coupons may then be redeemed by the user. Coupons are provided and monitored such that each coupon may be redeemed a predetermined number of times.

14 Claims, 4 Drawing Sheets

METHOD AND APPARATUS FOR PROVIDING AND MONITORING COUPONS VIA A NETWORK

FIELD OF THE INVENTION

The present invention relates to entertainment systems; and more specifically the present invention relates to providing and monitoring interactive coupons in an entertainment system.

BACKGROUND OF THE INVENTION

Interactive entertainment systems have developed that allow users to tailor their entertainment to their specific tastes. These entertainment systems may, for example, allow a user to choose what movie he or she wishes to see and the time at which the movie is viewed. The systems may also allow a user to play a game without the requirement of buying specific hardware and software to play the game.

In the systems described above, it would be desirable to provide a method and apparatus for providing coupons where a target audience is selected based on certain observed or disclosed preferences. Such a coupon system would reduce the number of coupons delivered to those who have no interest in the product for which the coupon is offered. Also, providers of coupons may provide different types of coupons to different types of users rather than standard coupons to a large number of users.

FIELD OF THE INVENTION

A method and apparatus for providing coupons to a device within a network is described. A target audience of one or more users of the network is determined where the target audience is based on preferences of respective users. In one embodiment, at least one of the preferences is stored in the respective user's device. In one embodiment, a coupon that may be used a predetermined number of times is provided to the target audience.

DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

A method and apparatus for providing and monitoring coupons via an entertainment system in a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Briefly, the present invention provides a method and apparatus for targeting specific audiences for coupon distribution. In one embodiment, users of an entertainment network are monitored to determine specific preferences. Alternatively, the users may be surveyed to determine preferences. A preference profile is determined based on the preferences. Coupons are distributed only to the users that fit a coupon distributor's chosen preference profile. The coupons may be delivered in a variety of ways. For example, coupons may be downloaded to a user's system automatically or on demand. Alternatively, coupons may be mailed to the user automatically or on demand. Of course, coupons may be delivered in other manners, such as during a vertical blanking interval (VBI), via the Internet, on a CD-ROM or a digital video disc (DVD). The coupons may then be redeemed by the user. Coupons provided are monitored such that each coupon may be redeemed a predetermined number of times.

Figure 1:
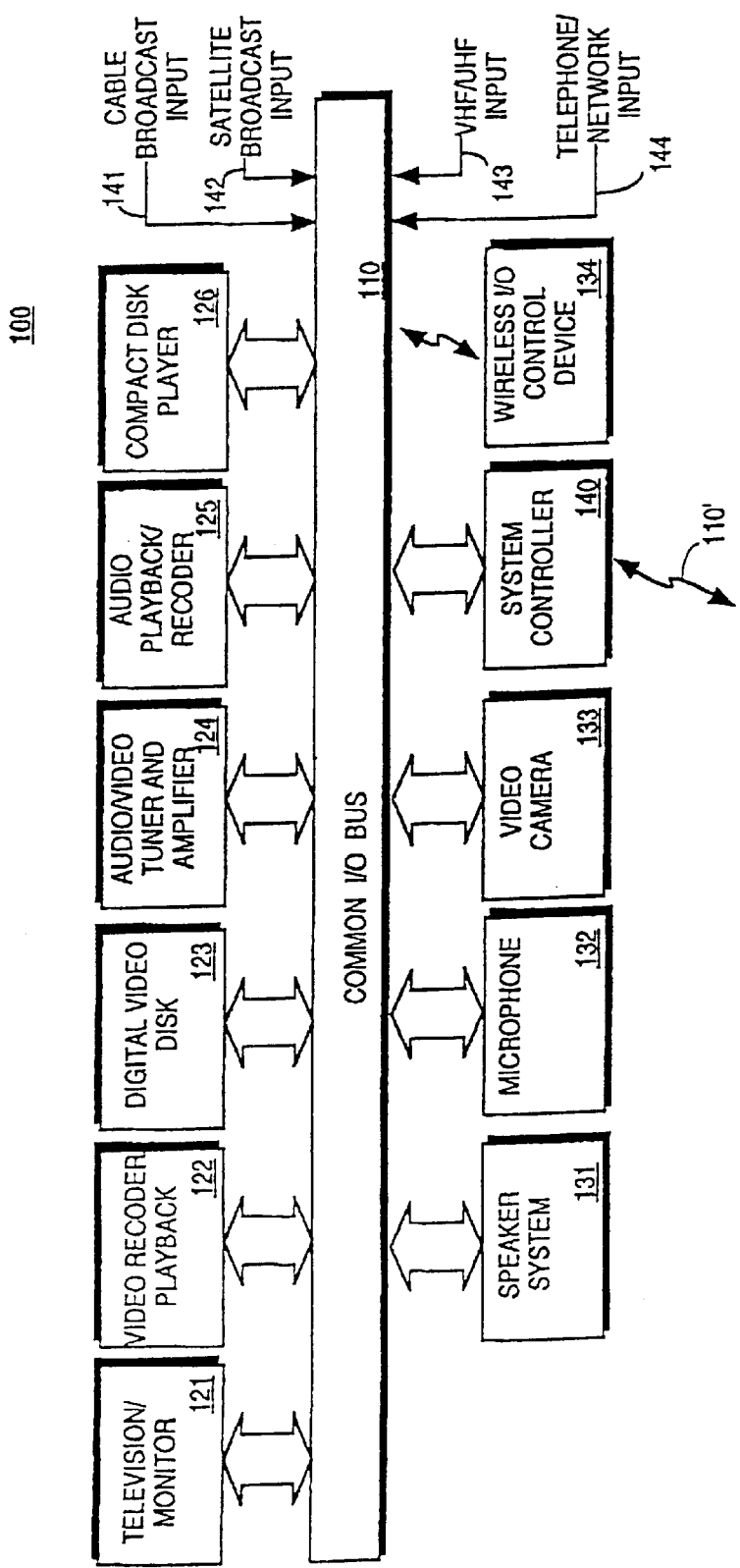
FIG. 1 is one embodiment of a block diagram of system components of an entertainment system according the present invention.

FIG. 1 is a block diagram illustrating system components of an entertainment system 100 according to one embodiment of the present invention. The entertainment system includes input/output (I/O) bus 110 that connects the system components in the entertainment system 100 together. It should be appreciated that I/O bus 110 is illustrated to simplify the routing of signals between the entertainment system components. I/O bus 110 may represent a plurality of known mechanisms and techniques for routing I/O signals between the entertainment system components. For example, I/O bus 110 may include an appropriate number of independent audio "patch" cables that route audio signals, coaxial cables that route video signals, two-wire serial lines or infrared or radio frequency transceivers that route control signals, or other routing mechanisms that route other signals.

In the illustrated embodiment, entertainment system 100 includes television/monitor 121, video recorder/playback device 122, digital video disc (DVD) recorder/playback device 123, audio/video (A/V) tuner and amplifier 124, audio playback/recorder device 125, and compact disc (CD) player 126 coupled to I/O bus 110. Video recorder/playback device 122, DVD recorder/playback device 123, audio playback/recorder device 125, and compact disc player 126 may be single disc or single cassette devices, or alternatively may be multiple disc or multiple cassette devices.

In addition, entertainment system 100 includes speaker system 131, microphone 132, video camera 133, and wireless I/O control device 134. In one embodiment, wireless I/O control device 134 is an entertainment system remote control unit which communicates with the components of entertainment system 100 through IR signals. In another embodiment, wireless I/O control device 134 may be a wireless keyboard and cursor positioning device that communicates with the components of entertainment system 100 through IR signals or RF signals. In yet another embodiment, wireless I/O control device 134 may be an IR remote control device similar in appearance to a typical entertainment system remote control with the added feature of a track-ball or other navigational mechanisms which allows a user to position a cursor on a display of entertainment system 100.

Entertainment system 100 also includes system controller 140. According to one embodiment of the present invention, system controller 140 operates to store and display entertainment system data available from a plurality of entertainment system data sources. According to another embodiment of the present invention, system controller 140 is configured to control a wide variety of features associated with each of the system components. As shown in FIG. 1, system controller 140 is coupled, either directly or indirectly, to each of the system components, as necessary, through I/O bus 110.

In one embodiment, in addition to or in place of I/O bus 110, system controller 140 is configured with a wireless communication transmitter (or transceiver), which is capable of communicating with the system components via IR signals or RF signals 110'. Regardless of the control medium, system controller 140 is configured to control one or more of the entertainment system components of entertainment system 100, although it is understood that each of the components may be individually controlled with wireless I/O control device 134.

It should be appreciated that system controller 140 may be implemented by any known computing device. Examples of such computing devices include conventional desktop computers as well as Internet "appliance" devices, such as WebTV™ Internet Terminal available from Microsoft Corporation of Redmond, Wash., or WebTV Networks Inc. of Palo Alto, Calif. It should also be appreciated that several entertainment system components depicted in FIG. 1 can be beneficially combined. By way of example, system controller 104 may be integrated into television/monitor 121, DVD 123, or audio/video tuner and amplifier 124.

As illustrated in FIG. 1, entertainment system 100 may be configured to receive entertainment system data from a wide variety of entertainment system data sources. In one embodiment, entertainment system 100 receives programming input from one or more of the following sources: cable broadcast 141 (including from the vertical blanking interval (VBI), or a separate channel), satellite broadcast 142 (e.g., via a satellite dish), very high frequency (VHF) or ultra high frequency (UHF) radio frequency communication of broadcast networks 143 (e.g., via an aerial antenna), telephone/computer network interface 144, and/or information stored locally at system controller 140 or another component of entertainment system 100.

Further, it will be appreciated by one skilled in the art, that cable broadcast input 141, satellite broadcast input 142 and VHF/UHF input 143 may receive input from digital broadcast programming and digital cable programming. Additionally, A/V programming may be received from a CD-ROM, DVD or other digital storage device. The Internet, an entertainment network, or other network may also provide A/V programming. Of course, coupons may be received from one or more of the sources listed above whether or not A/V programming is also received from the source(s).

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
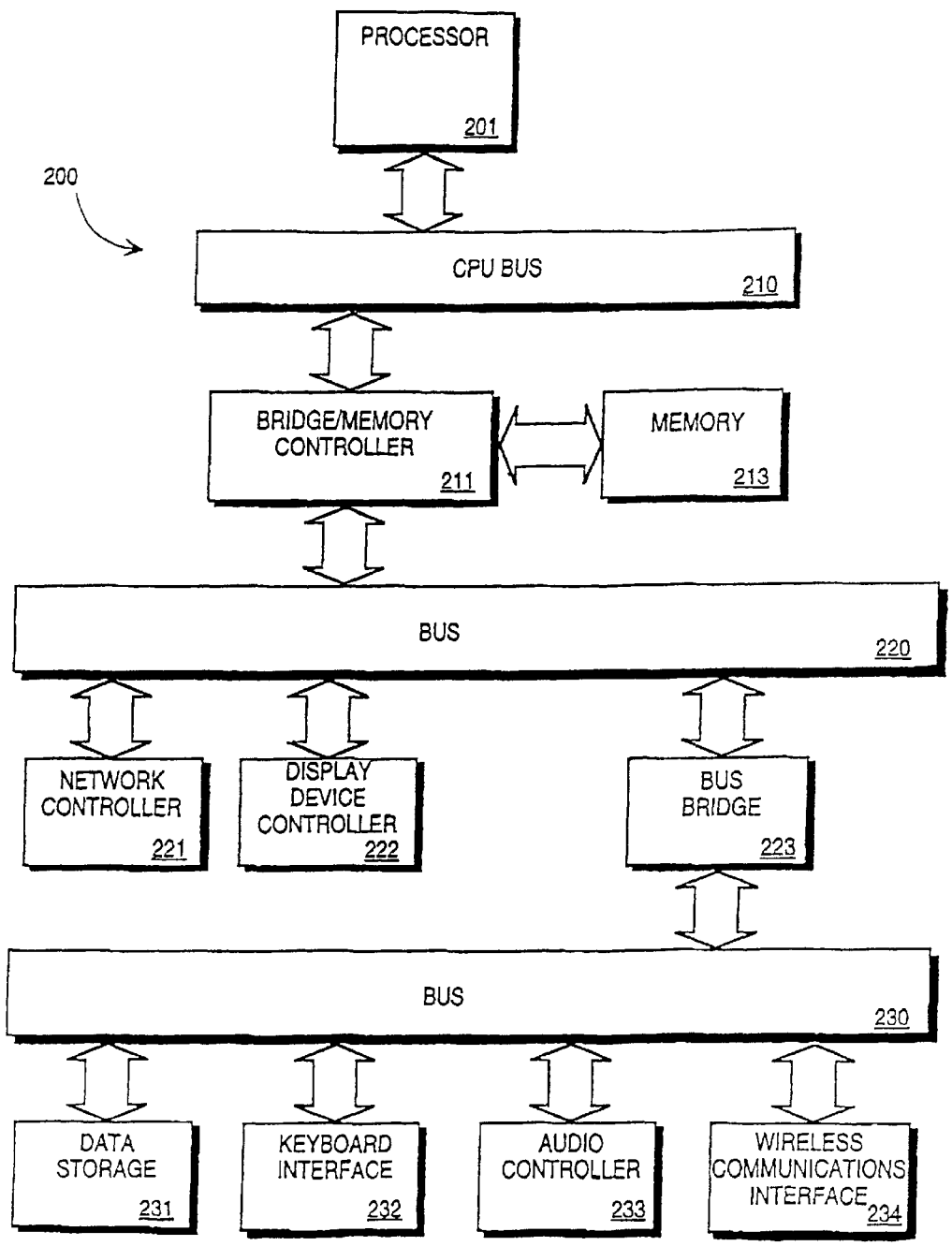
FIG. 2 is one embodiment of a block diagram of a computer system that may be used to implement a system controller according to the present invention.

FIG. 2 is a block diagram illustrating an embodiment of a computer system 200 that may be used to implement system controller 140 according to the present invention. Computer system 200 includes processor 201 that processes digital data signals. Processor 201 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 2 is a single processor computer system. However, it is understood that the present invention may be implemented in a computer system having multiple processors. Processor 201 is coupled to CPU bus 210 which transmits data signals between processor 201 and other components in computer system 200.

As an example, memory 213 may be a dynamic random access memory (DRAM) device, a static random access memory (SRAM) device, or other memory device. Memory 213 stores information or other intermediate data signals that are executed by processor 201. Cache memory 202 resides inside processor 201 that stores information or other intermediate data that is stored in memory 213. Cache 202 speeds up memory accesses by processor 201 by taking advantage of its locality of access. In an alternate embodiment of computer system 200, cache 202 or a second cache resides external to processor 201.

Bridge memory controller 211 is coupled to CPU bus 210 and memory 213. Bridge memory controller 211 directs data signals between processor 201, memory 213, and other components in computer system 200 and bridges data signals from these components to first I/O bus 220.

First I/O bus 220 may be a single bus or a combination of multiple buses. As an example, first I/O bus 220 maybe a high performance I/O bus that operates at high throughput rates. First I/O bus 220 may include for example a Peripheral Components Interconnect (PCI) bus, a Personal Computer Memory Card International Association (PCMCIA) bus, a NuBus, or other buses. First I/O bus 220 provides communication links between components in computer system 200. Network controller 221 links computer system 200 to a network of computers and supports communication among the machines. Display device controller 222 is coupled to first I/O bus 220. Display device controller 222 allows coupling of a display device to computer system 200 and acts as an interface between the display device and computer system 200. Display device controller 222 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from processor 201 through display device controller 222 and displays the information and data signals to the user of computer system 200.

Second I/O bus 230 may be a single bus or a combination of multiple buses. Second I/O bus 230 may include an Industry Standard Architecture (ISA) bus, an Extended Industry Standard Architecture (EISA) bus, or other buses. Second I/O bus 230 provides communication links between components in computer system 200. Keyboard interface 232 may be a keyboard controller or other keyboard interface. Keyboard interface 232 may be a dedicated device or can reside in another device such as a bus controller or other controller. Keyboard interface 232 allows coupling of a keyboard to computer system 200 and transmits data signals from a keyboard to computer system 200. Data storage device 231 may be a hard disk drive, a floppy disk drive, a CD-ROM device, a flash memory device or other mass storage device. Audio controller 233 operates to coordinate the recording and playing of sounds is also coupled to second I/O bus 230. Wireless communications interface 234 may be an IR transceiver or a RF transceiver for transmitting and receiving signals between components of entertainment system 100 (shown in FIG. 1).

Bus bridge 223 couples first I/O bus 220 to second I/O bus 230. Bus bridge 223 operates to buffer and bridge data signals between first I/O bus 220 and second I/O bus 230.

According to one embodiment, configuring a graphical user interface that presents entertainment system data with multimedia identifiers is performed by computer system 200 in response to processor 201 executing sequences of instructions contained in memory 213. Such instructions may be read into memory 213 from other computer-readable mediums such as data storage device 231 or from a computer connected to the network via network controller 211. Execution of the sequences of instructions contained in memory 213 causes the processor to configure a graphical user interface that presents entertainment system with multimedia identifiers, as will be described hereafter. In alternative embodiments, hard-wire circuitry may be used in place of or in combination with software instructions to implement the present invention. Thus, the present invention is not limited to any specific combination of hardware circuitry and software.

Figure 3:
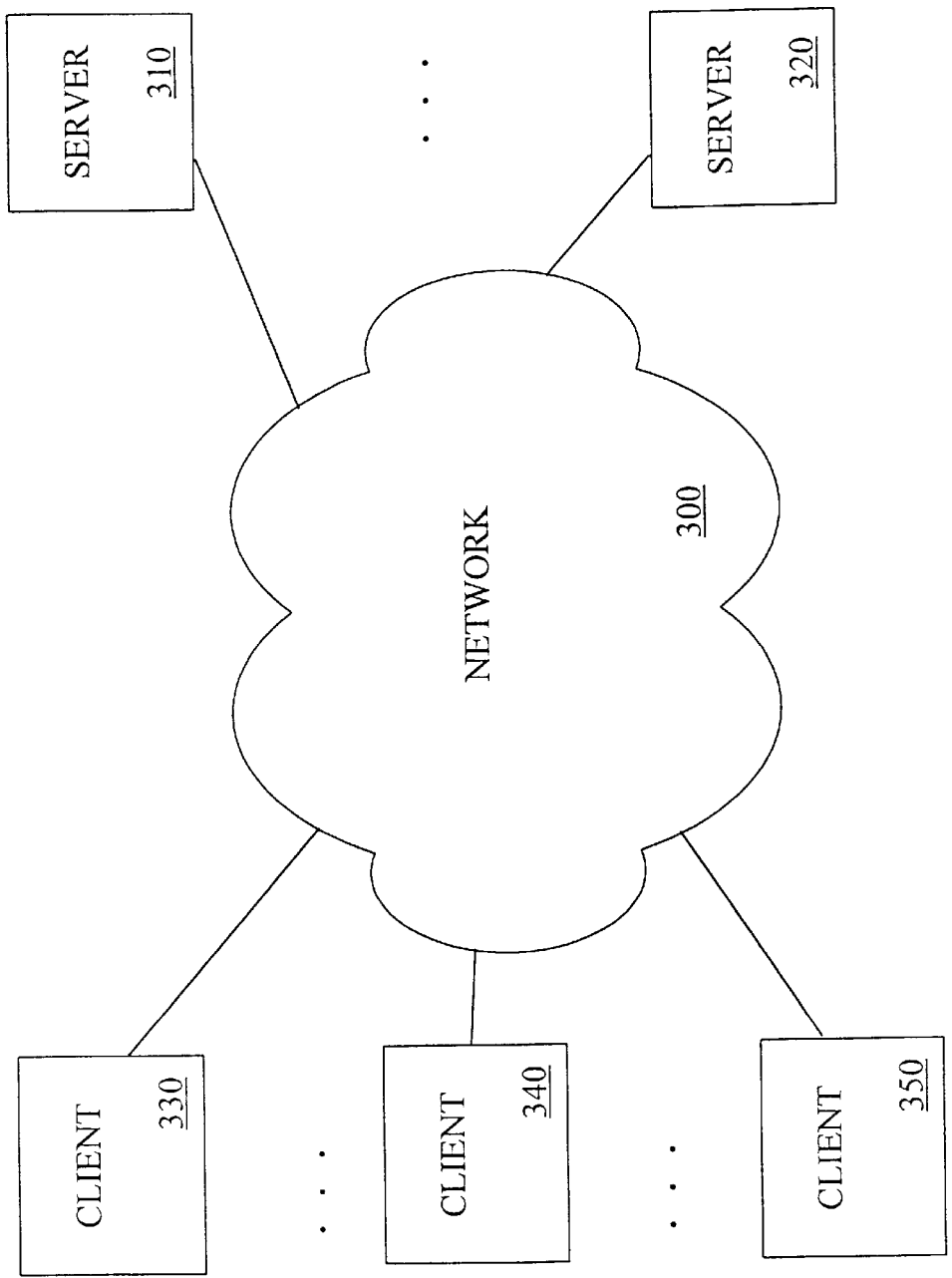
FIG. 3 is one embodiment of a network that may provide coupons according to the present invention.

FIG. 3 is one embodiment of a network that may provide coupons according to the present invention. Generally, the network connects a number of clients to a number of servers that provide services and data to the clients via the network. One or more of the servers provides coupons to a selected target group of clients. The users of the clients may then redeem the coupon(s). The clients and/or servers may be used to provide desired demographic distribution of the coupons.

Network 300 provides a connection between multiple clients, such as clients 330, 340 and 350 and one or more servers, such as servers 310 and 320. Network 300 may be the Internet, an intranet or any other type of network. Alternatively, network 300 may be a telephone network wherein clients communicate with servers through modems (not shown in FIG. 3). In a telephone network embodiment, clients use modems to call a modem pool through which the clients are connected to one or more servers in a manner well known in the art. Clients may access network 300 via a satellite communications link, a two way cable broadcast, cellular telephone network, radio frequency (RF) communications, or other wireless communications method.

One or more servers connected to network 300, such as servers 310 and 320 provide services and data to one or more clients connected to network 300. For example, server 310 may provide listing data corresponding to entertainment such as television, games or other entertainment opportunities. Alternatively, the servers may be part of the Internet or World Wide Web (WWW, or the Web).

One or more of the clients connected to network 300, such as clients 330, 340 and 350 may the entertainment system of FIG. 1 or the computer system of FIG. 2. Alternatively, the clients connected to network 300 may be personal computers or devices to access network 300, such as set-top boxes or other network devices. The entertainment system may provide a user with, for example, television program listings and recording capabilities, games that may be played individually or with others, and other types of entertainment. Of course, client device may be a personal computer through which a user accesses the Internet or the Web as well as the entertainment network described above.

In one embodiment, the entertainment preferences of users of network 300 are observed and recorded (e.g., by server 320 or client 330) for determining a target audience to which coupons are delivered. In addition, other types of preferences, such as the times at which the network is used may be monitored and used in determining a target audience. Gathering of preference data may be accomplished, for example, by observing or otherwise determining the type of television programming or other entertainment a particular user selects. Alternatively, users may disclose various preferences as part of registering with the entertainment network or as part of some other promotion. Preference data is compiled and preference profiles for different users of network 300 are generated based on the preference data. Preference profiles for network users are maintained in a database on a server, a client or in some other appropriate manner.

Preferences may include, but are not limited to, the following: whether a user enjoys sports and what types of sports he or she enjoys, whether a user enjoys outdoor activities and what type of activities he or she enjoys, what type of television programming the user enjoys, etc. In addition the geographical location, native language, annual salary and/or profession or occupation of the user may be used to determine preferences. The types of foods enjoyed by the user could also be used in determining a preference profile for users. Of course, an exhaustive list is not provided and many more types and combinations of preferences could be used to build preference profiles.

Building of preference profiles for users allows server 320 to deliver coupons to specific users that have an observed or disclosed preference for a particular service, product or activity. Coupons may also be delivered to users whose preferences include services, products or activities that are related to the service, product or activity that is the subject of a particular coupon, etc. Alternatively, a coupon may be provided as an attempt to induce a user to try a new service, product or activity.

Of course more than one server connected to network 300 may provide coupons. For example, different servers may provide coupons for different users. Alternatively, different servers may provide coupons for different preference profiles or coupon suppliers. In one embodiment, a coupon repository is provided, such that coupons are delivered from specific server(s). In such an embodiment, companies or groups who wish to have coupons delivered disclose the specifics of the coupon, such as the target audience preference profile, the value of the coupon, how many times the coupon may be redeemed, when the coupon should be delivered, how long the coupon is valid, etc. to the coupon repository. The coupon repository then delivers the coupons to the network clients that meet the desired preference profile.

In an alternative embodiment, servers that provide coupons may broadcast coupon delivery over network 300. When one or more coupons are broadcast, the client(s) coupled to network 300 filter the coupon(s) based on preference profiles compiled by and stored in the client. In such an embodiment, coupon(s) that satisfy the preference profile are passed to the client device and may be redeemed by the user.

The coupons may be delivered in a variety of ways. For example, a coupon may be sent to a user's electronic mail address. The user then prints the coupon and redeems the coupon when making a purchase. The coupon may also be downloaded to a client upon the user accepting a coupon offer or automatically when a user connects to network 300. In another embodiment, the coupon is mailed to the user though traditional mail channels either automatically or when the user accepts a coupon offer.

Additionally, coupons my be delivered via VBI, satellite and/or cable broadcast, or by UHF and/or VHF channels.

Coupons may also be delivered by CD-ROM, DVD, floppy disk or other storage medium.

Figure 4:
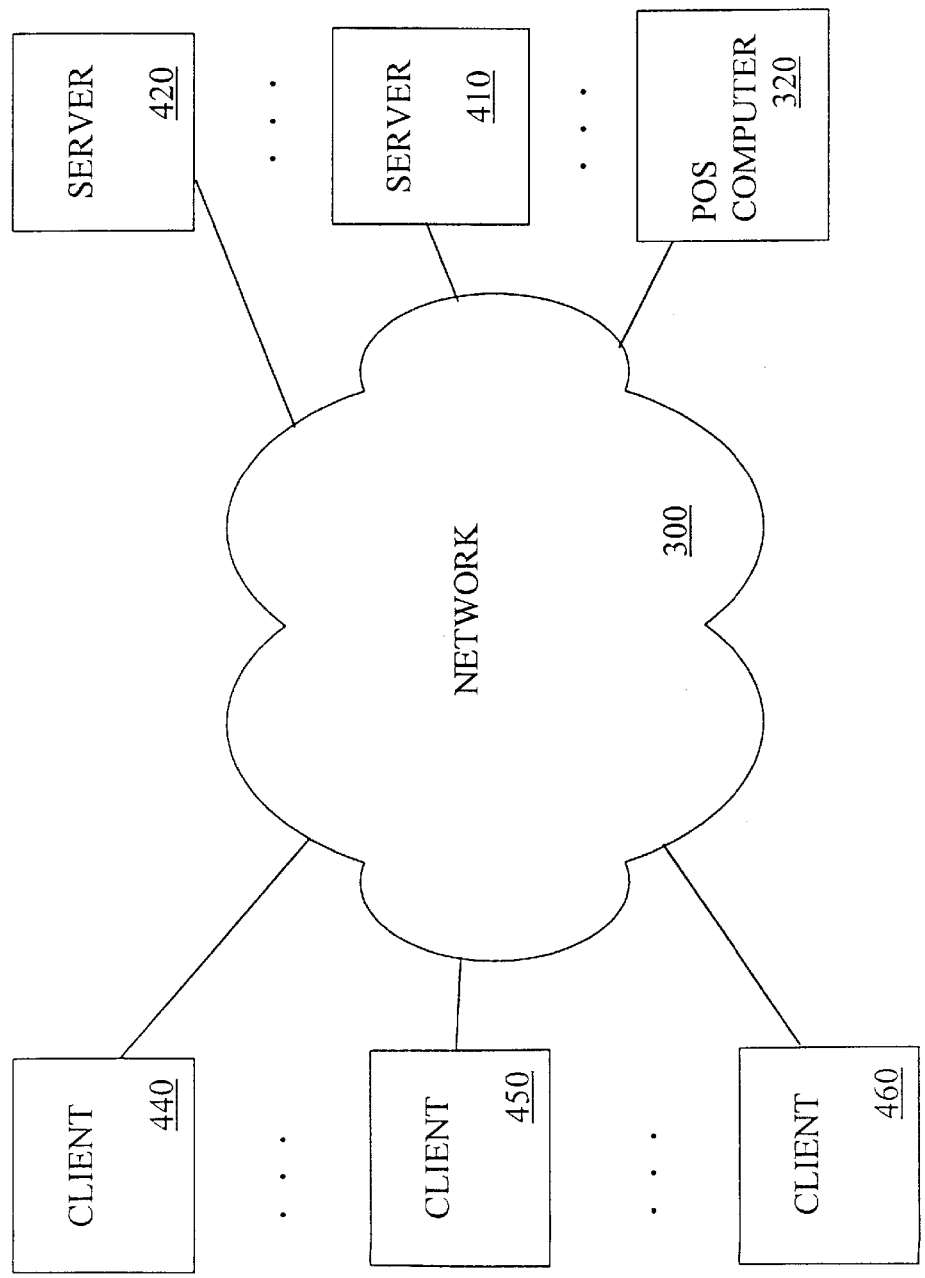
FIG. 4 is one embodiment of a network including a retail point of sale (POS) device that may provide coupons according to the present invention.

FIG. 4 is one embodiment of a network including a retail point of sale (POS) device. The network may provide coupons according to the present invention. The network of FIG. 4 is similar to the network of FIG. 3 except that the network of FIG. 4 includes point of sale (POS) computer 425. The client devices in FIG. 4 receive coupons in the same manner as the client devices of FIG. 3.

Network 400 connects one or more client devices, such as clients 440, 450 and 460 to one or more server devices, such as servers 420 and 410. POS computer 425 is also coupled to network 400 to communicate with clients and/or servers. Only one POS computer is shown in FIG. 4 for simplicity of description. Of course, more than one POS computer may be coupled to network 400.

POS computer 425 is located at, or communicates with, a retail store and is used to determine which coupons have been redeemed by users. This may be accomplished, for example, when a user prints a coupon that has been offered to him or her. In one embodiment, the coupon is printed by a client, such as client 450. Client 450 then reports to the sending server, such as server 420 that the coupon has been printed. When the user redeems the coupon at a store, POS computer 425 checks with server 420 (or the coupon repository) to determine whether the particular coupon has been redeemed. If not, the retailer accepts the coupon. Otherwise, the coupon is rejected.

Alternatively, a user may accept a coupon offer with a client device, such as client 440 and have the coupon mailed to him or her via traditional mail services. In this embodiment, the user would redeem the coupon in the same manner that traditional coupons are redeemed. POS computer 425 may also be used in such an embodiment to determine whether the coupon has been previously redeemed to prevent a user from making copies and continually redeeming the same coupon. Of course, coupons could also be delivered according to one of the methods discussed above.

In an alternative embodiment, coupon presentment occurs during advertisement. For example, during an advertisement, a user may be asked whether or not he or she wishes to receive a coupon for the product/service currently being advertised. If so, the coupon is delivered according to one of the methods discussed above.

In the embodiments discussed with respect to FIG. 4, the coupon repository or other service maintains a coupon database that keeps a record of the coupons delivered. In this manner a retailer may, via a POS or other type of computer, determine whether the coupon presented should be redeemed. Thus, if desired, the coupon may only be redeemed by a specific person or group. Also, a coupon may be redeemed only for specific purposes. Alternatively, the coupons may be serialized so that each coupon may be redeemed only once.

From the foregoing description, an invention has been described that allows coupons to be delivered to specific people or groups such that wide distribution of coupons may be avoided. Advertisers can thus target coupon distribution and associated advertisements in a manner that reduces advertisement costs. In addition, users receive coupons and associated advertisements that are more likely to be of interest to them than would otherwise be possible through mass mailings or similar types of coupon and advertisement distribution thus reducing the quantity of junk mail, either electronic or traditional, that a user receives.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

determining a target audience of one or more users of devices coupled to a network, wherein the target audience is determined based on one or more preferences of the users stored in the respective users' devices; and providing a coupon to the target audience determined, wherein each coupon may be used a predetermined number of times, wherein providing a coupon to the target audience further comprises:

determining a subset of users of the network based on a preference profile;

delivering one or more coupons to the subset of users; and monitoring redemption of the one or more coupons such that each coupon may be used a predetermined number of times.

2. The method of claim 1, wherein determining a target audience further comprises:

monitoring network usage by the users;

determining a preference profile for respective users, wherein the preference profile is based on network usage by the respective users; and selecting a subset of users of the network based on the preference profile.

3. The method of claim 1, wherein determining a target audience further comprises:

determining a preference profile for respective users, wherein the preference profile is based on revealed preferences of the respective users; and selecting a subset of users of the network based on the preference profile.

4. The method of claim 1, wherein monitoring redemption of the one or more coupons further comprises:

maintaining a coupon database that stores information related to coupons that have been distributed; and checking the coupon database to determine whether a particular coupon is valid.

5. The method of claim 1, wherein monitoring redemption the one or more coupons further comprises serializing the coupons such that each coupon may be redeemed once.

6. An apparatus for providing coupons to a device coupled to a network comprising:

means for determining a target audience of one or more users of devices coupled to the network, wherein the target audience is determined based on one or more preferences of respective users stored in the respective client devices; and means for providing a coupon to the target audience, wherein each coupon may be used a predetermined number of times, wherein means for providing a coupon to the target audience further comprises:

means for determining a subset of users of the network based on a preference profile;

means for delivering one or more coupons to the subset of users; and means for monitoring redemption of the one or more coupons such that each coupon may be used a predetermined number of times.

7. The apparatus of claim 6, wherein means for determining a target audience further comprises:
   means for monitoring network usage of users;
   means for determining a preference profile for respective users, wherein the preference profile is based on network usage by the respective users and is stored in respective user client devices; and
   means for selecting a subset of users of the network based on the preference profile.

8. The apparatus of claim 6, wherein means for determining a target audience further comprises:
   means for determining a preference profile for respective users, wherein the preference profile is based on revealed preferences of the respective users; and
   means for selecting a subset of users of the network based on the preference profile.

9. The apparatus of claim 6, wherein means for monitoring redemption of the one or more coupons further comprises:
   means for maintaining a coupon database that stores information related to coupons that have been distributed; and
   means for checking the coupon database to determine whether a particular coupon is valid.

10. The apparatus of claim 6, wherein means for monitoring the one or more coupons further comprises means for serializing the coupons such that each coupon may be redeemed once.

11. A machine readable medium having stored thereon sequences of instructions that, when executed by one or more processors, cause an electronic device to:
   determine a target audience of one or more users of devices coupled to the network, wherein the target audience is determined based on one or more preferences of respective users stored in the respective client devices; and
   provide a coupon to the target audience, wherein each coupon may be used a predetermined number of times, wherein the sequences of instructions that cause the electronic device to provide a coupon to the target audience further comprises sequences of instructions that, when executed, cause the electronic device to:
   determine a subset of users of the network based on a preference profile;
   deliver one or more coupons to the subset of users; and
   monitor redemption of the one or more coupons such that each coupon may be used a predetermined number of times.

12. The machine readable medium of claim 11, wherein the sequences of instructions that cause the electronic device to determine a target audience further comprises sequences of instructions that, when executed, cause the electronic device to:
   monitor network usage of users;
   determine a preference profile for respective users, wherein the preference profile is based on network usage by the respective users; and
   select a subset of users of the network based on the preference profile.

13. The machine readable medium of claim 11, wherein the sequences of instructions that cause the electronic device to determine a target audience further comprises sequences of instructions that, when executed, cause the electronic device to:
   determine a preference profile for respective users, wherein the preference profile is based on revealed preferences of the respective users; and
   select a subset of users of the network based on the preference profile.

14. The machine readable medium of claim 11, wherein the sequences of instructions that cause the electronic device to monitor redemption of the one or more coupons further comprises sequences of instructions that, when executed, cause the electronic device to:
   maintain a coupon database that stores information related to coupons that have been distributed; and
   check the coupon database to determine whether a particular coupon is valid.

* * * * *

UNITED STATES PATENT AND TRADEMARK OFFICE
CERTIFICATE OF CORRECTION

PATENT NO.   : 6,075,971                                                    Page 1 of 1
DATED        : June 13, 2000
INVENTOR(S)  : Williams et al.

It is certified that error appears in the above-identified patent and that said Letters Patent is hereby corrected as shown below:

<u>Column 1,</u>
Line 30, delete "FIELD", insert -- SUMMARY --.

Signed and Sealed this

Eighteenth Day of February, 2003

JAMES E. ROGAN
*Director of the United States Patent and Trademark Office*